United States Patent
Bunting et al.

[11] Patent Number: 5,588,638
[45] Date of Patent: Dec. 31, 1996

[54] BALL VALVE

[76] Inventors: Bryce T. Bunting, 1900 Country Club Rd., Statesboro, Ga. 30458; Lalan W. Cook, 5957 St. Lukes Church Rd., Prosperity, S.C. 29127

[21] Appl. No.: 523,690

[22] Filed: Sep. 5, 1995

[51] Int. Cl.[6] ........................................ F16K 5/06
[52] U.S. Cl. .................... 251/315.05; 251/315.16
[58] Field of Search ..................... 251/315.08, 315.16, 251/315.05; 137/238, 239

[56]  References Cited

U.S. PATENT DOCUMENTS

| | | | |
|---|---|---|---|
| 3,191,906 | 6/1965 | Zeigler et al. | 251/304 X |
| 3,336,939 | 8/1967 | Freed et al. | 137/375 |
| 3,348,805 | 10/1967 | Sanctuary | 251/315.05 |
| 3,447,781 | 6/1969 | Fawkes | 251/815.05 |
| 3,525,352 | 8/1970 | Jensen | 137/238 |
| 3,528,448 | 9/1970 | Urban | 251/308 X |
| 3,801,065 | 4/1974 | Peters, Jr. et al. | 251/315 |
| 3,814,381 | 6/1974 | Yopp | 251/315 |
| 3,943,959 | 3/1976 | Kirkland | 137/238 |
| 3,951,380 | 4/1976 | Oliva-Bonino | 251/315 |
| 4,103,868 | 8/1978 | Thompson | 251/315 |
| 4,118,009 | 10/1978 | Chmura | 251/315 |
| 4,418,887 | 12/1983 | Tubaro | 251/152 |
| 4,531,273 | 7/1985 | Smith et al. | 251/315.16 X |
| 4,542,878 | 9/1985 | Kulisek | 251/315.16 |
| 5,016,857 | 5/1991 | Bovee et al. | 251/304 |

Primary Examiner—John C. Fox
Attorney, Agent, or Firm—Michael A. Mann, P.A.

[57]  ABSTRACT

The present invention is a ball valve that prevents scale formation on the exterior surface of the ball element, and therefore extends the life and efficiency of the ball valve. The ball valve comprises a ball element, a housing, and a jacket. The ball element has three ports formed therein and is seated within the jacket in the housing. The first and second ports of the ball element form a fluid conduit and the third port intersects the fluid conduit perpendicularly. In the open position, fluid flows through the housing into the first port of the ball element, through the fluid conduit, and out the third port. In the closed position, the fluid flows into the third port and into the fluid conduit but does not continue to flow through the housing. The design of the ball element does allow the exterior surface of the ball element to be exposed to the fluid, and thus prevents scale formation from occurring on this surface. Additionally, the ball may be impregnated with a substance to reduce scale formation and to reduce the amount of friction between the jacket and the exterior of the ball element. The jacket is also constructed from a material that will reduce the amount of friction between the exterior surface of the ball element and the jacket.

3 Claims, 2 Drawing Sheets

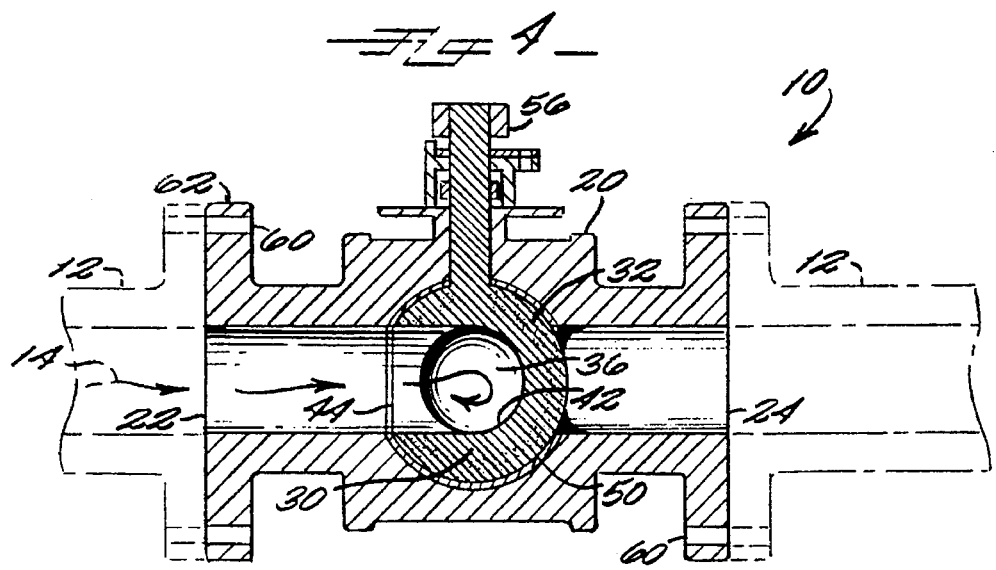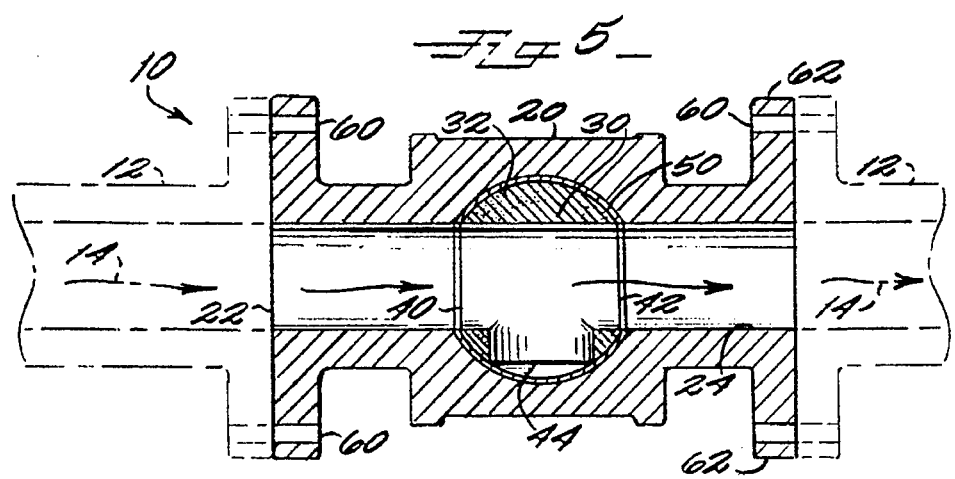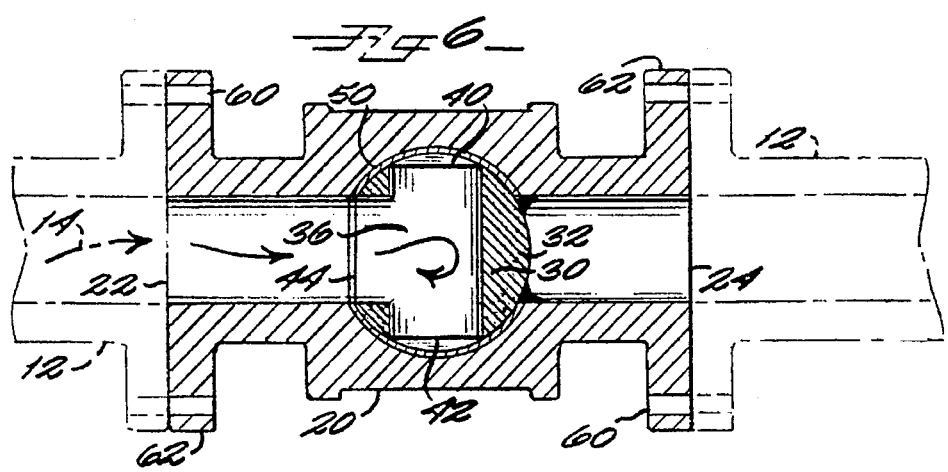

BALL VALVE

BACKGROUND OF THE INVENTION

1. Field of the Invention

The present invention relates generally to ball valves, especially those in use in controlling the flow of fluids that tend to degrade process piping.

2. Discussion of Background

In many applications, especially in industrial processes, ball valves are used to control the flow of a fluid through piping. A ball valve is essentially a ball or sphere with a hole or port formed in it that is the same size as the pipe inner diameter. The ball is placed in a housing that is inserted in series with a pipe chase. The ball can be rotated to orient the port so that its axis is either aligned with the piping axis of the piping or perpendicular to it. When the port is aligned with the piping, the valve permits fluid flow; when perpendicular, flow is stopped.

Like many moving parts, the ball may be lubricated or the surface of the ball or the interior surface of its housing covered in a "slippery" plastic or synthetic material having a low coefficient of friction.

Sometimes, however, the environment of use of the valve is especially harsh. For example, if the fluid is corrosive or tends to form scale on metal surfaces, the ball may become difficult to turn within its housing, or the smooth tight fit of the ball against the inside of its housing may gradually be degraded to the point where the valve will start to leak.

One such harsh environment occurs in paper making. When wood pulp is processed, it is dissolved in a caustic chemical solution. The dissolved wood cellulose solution is called "green liquor." The green liquor will form scale on ball valves. As a result, ball valves used in piping that conducts green liquor require frequent descaling. When a process line is taken out of service for maintenance, that line is not productive and costs money.

Processing chlorine also is an inherently difficult fluid for controlling using ball valves. In addition to scale formation, chlorine trapped in the port of the ball valve when it is closed can explode. Therefore, a small vent hole is made in the ball to reduce the pressure on the trapped chlorine. This hole, typically 1/16 inch in diameter, is drilled so that, when the valve is closed, it vents upstream or downstream, but usually upstream.

Several valves have been designed for fluids that form scale on the valve's parts, including one specifically used in paper manufacturing, namely that disclosed by Zeigler, et al. in U.S. Pat. No. 3,191,906. Zeigler, et al. teach a valve where the moving part is not a ball, but a structure that is concave on the downstream side of the flow and convex on the upstream side when the valve is in the closed position. Bovee, et al., in U.S. Pat. No. 5,016,857, teach a similar configuration in a higher-flow-capacity valve, where, again, to close the valve, the convex side of the hollowed ball is rotated to face the upstream pipe.

Urban, U.S. Pat. No. 3,528,448, addresses the problem of scale formation in aluminum refining using a control element similar to those of Bovee, et al. and Zeigler, et al. His valve has scrapers to remove scale before it builds up. Like Bovee, et al.'s design, the convex side of Urban's valve faces upstream.

Kulisek's ball valve, described in U.S. Pat. No. 4,542,878, is directed to scale buildup. The surface of the ball of the valve that is exposed to the upstream side when the valve is closed is recessed.

Coatings in general for ball valves are not new. Smith, et al. describe a process in U.S. Pat. No. 4,531,273 for impregnating the surface of a ball valve, etc. with a polymer. Oliva-Bonino, in U.S. Pat. No. 3,951,380 discloses the use of TEFLON coatings on ball valves, and Yopp teaches a TEFLON seat for a ball valve in U.S. Pat. No. 3,814,381. See also the specification of Sanctuary in U.S. Pat. No. 3,348,805, for a description of another plastic resin coating, DELRIN, for ball valves.

However, there remains a need for a ball valve that can operate longer between scheduled maintenance because scaling does not affect its performance.

SUMMARY OF THE INVENTION

Briefly stated and broadly described, the present invention is a ball valve having a first port and second port formed through a ball as a fluid conduit and a third port formed perpendicular to and intersecting the fluid conduit. When the valve is opened by turning it so the first port faces upstream and the second port faces downstream, it operates as does any other ball valve. When closed so that the third port is presented to the upstream piping and the first and second ports are perpendicular to the main piping axis, the third port, dimensioned so that it has the same shape and size as the upstream process piping, provides no surface on which scale can build up to affect the rotation of the ball. The rotational surface of the ball—the part of the exterior surface of the ball that engages the inside of the housing—is not in contact with the process fluid when the ball is closed or open.

Preferably, the interior surface of the ball valve housing is lined with a "jacket" made of a fluoropolymer such as TEFLON® and the surface of the ball itself impregnated with another fluoropolymer such as XYLAN® to a depth of 1/8 inch to 1/4 inch. The ball's exterior surface moves with respect to the jacket when the valve is being opened and closed.

The third port is an important feature of the present invention. The third port connects with the fluid conduit so that only the interior surface of the ball is exposed to process fluids. Scale will form on the interior surface of the ports and fluid conduit of the ball, where, when the valve is opened, it will be eroded away. Furthermore, in the case of chlorine processing, the third port will vent the valve when closed.

The size of the third port is another important feature of the present invention. It should be the same diameter and shape as the upstream piping, so that no portion of the ball's exterior surface is exposed to the process fluids. Because the first and second ports in the ball are usually this size and shape, the third port can be milled using the same milling machine as for the first and second port in the ball.

The fluoropolymer jacket of the housing and the impregnation of the ball with a second fluoropolymer are also important features of the present invention. The interface of these two materials makes it easier for the ball to turn in the housing and harder for scale to build up in the areas of the metal that are exposed to process fluids.

Other features and their advantages will be apparent to those skilled in the art of ball valve design from a careful reading of the following Detailed Description of Preferred Embodiments accompanied by the drawings.

BRIEF DESCRIPTION OF THE DRAWINGS

In the drawings,

FIG. 4 is a side cross-sectional view of a ball valve with the ball element shown in the closed position according to a preferred embodiment of the present invention;

FIG. 5 is a top cross-sectional view of a ball valve with the ball element shown in the open position according to a preferred embodiment of the present invention; and FIG. 6 is a top cross-sectional view of a ball valve with the ball element shown in the closed position according to a preferred embodiment of the present invention.

DETAILED DESCRIPTION OF PREFERRED EMBODIMENTS

Figure 1:
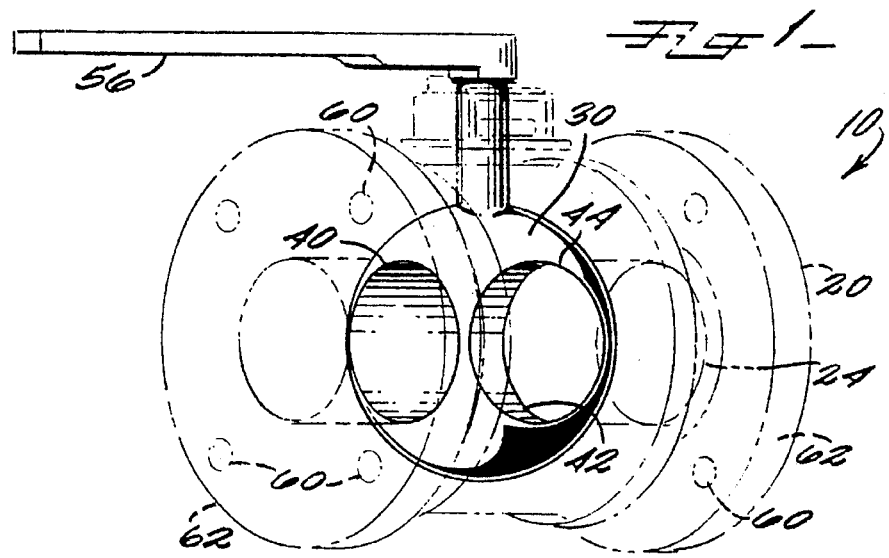
FIG. 1 is a perspective view of a ball valve with the ball element and handle shown in the open position with the jacket removed and the remainder of the housing shown in phantom lines for clarity, according to a preferred embodiment of the present invention.

In the following description, similar components are referred to by the same reference numeral in order to simplify the understanding of the sequential aspect of the drawings.

Figure 2:
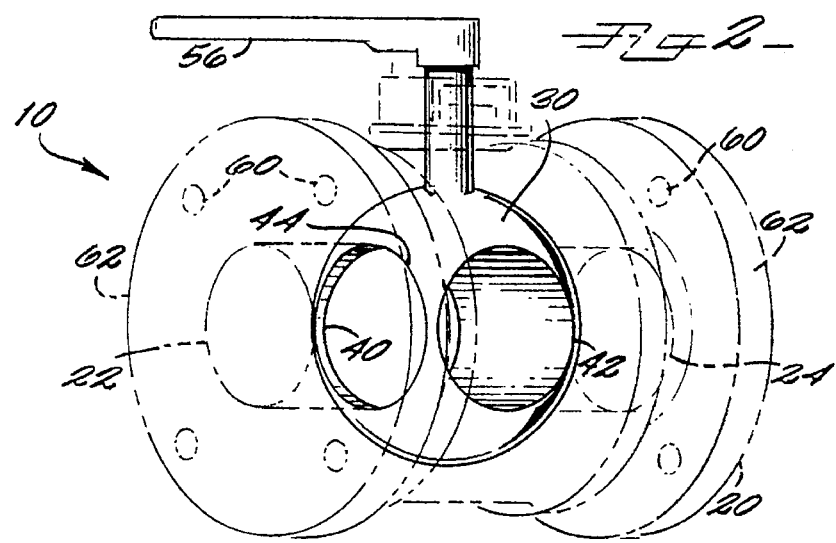
FIG. 2 is a perspective view of a ball valve with the ball element and handle shown in the closed position with the jacket removed and the remainder of the housing shown in phantom lines for clarity, according to a preferred embodiment of the present invention.
Figure 3:
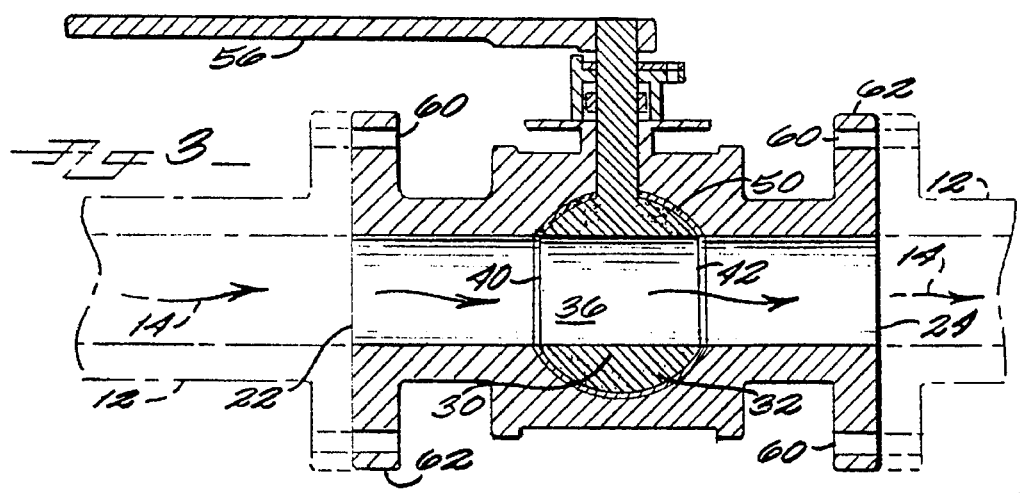
FIG. 3 is a side cross-sectional view of a ball valve with the ball element shown in the open position according to a preferred embodiment of the present invention.

The present invention is a ball valve 10 for use in process piping 12 that conducts process fluids 14 that are caustic, acidic or in some other way degrade the surfaces of process piping 12. Ball valve 10 in its preferred embodiment comprises a ball element 30 and a housing 20. Within housing 20 is a jacket 50 that lines a portion of the inside surface of housing 20. Ball element 30 pivots or turns from an open position, as best seen in FIGS. 1, 3, and 5, and a closed position, as best seen in FIGS. 2, 4, and 6, within jacket 50.

Housing 20 can be formed in any fashion known to those skilled in the art for other ball valve housings having similar characteristics as described below. Housing 20 has an upstream channel 22 and a downstream channel 24. Housing 20, in operation, is in fluid communication with process piping 12 so that fluid 14 flows through housing 20 from upstream channel 22 to downstream channel 24, when ball element 30 is in the open position.

Jacket 50 is positioned within housing 20 and is a layer of material attached along the interior surface of housing 20, so that it matches the exterior surface of ball element 30; that is, it has an inner diameter that is slightly larger than the outer diameter to ball element 30, and has two ports formed in it for the upstream and downstream sides. Jacket 50 is constructed from a material that will reduce the coefficient of friction between the surface of jacket 50 and the surface of ball element 30. An example of a suitable material for jacket 50 would be a fluoropolymer such as TEFLON®. Jacket 50 is dimensioned to fit within housing 20 so as to not interfere with the flow of fluid 14 from the upstream channel 22 through ball element 30 to downstream channel 24. The thickness of jacket 50 within housing 20 can be of a variety of sizes, depending on the size of housing 20, ball element 30, and the material jacket 50 is constructed of, along with other factors.

Ball element 30 is constructed from any suitable material known to those skilled in the art of valve construction. Ball element 30 is spherical in shape and dimensioned to have a larger diameter than the inside diameter of process piping 12, upstream channel 22, and downstream channel 24. Ball element 30 fits within jacket 50 so that the exterior surface of ball element 30 is in contact with the interior surface of jacket 50. Furthermore, ball element 30 can be impregnated with a substance 32, so that when the exterior surface of ball element 30 moves with respect to the interior surface of jacket 50, the amount of friction between the two surfaces is reduced. An example of substance 32 that can be used to impregnate ball element 30 is a fluoropolymer, such as XYLAN®. A typical depth of impregnation would be from a depth of ⅛ inch to ¼ inch. The method of impregnation can be of any type known to those skilled in the art for impregnating metal with another substance. The impregnation of substance 32 into ball element 30 also works in conjunction with jacket 50, to form a fluid tight seal. A good seal is important or leakage between ball element 30 and jacket 50 may occur, thus reducing the efficiency of ball valve 10.

Ball element has a first port 40, a second port 42, and a third port 44 within its exterior surface. In the preferred embodiment, first port 40 and second port 42 are coaxially aligned within ball element 30. First port 40 and second port 42 are in fluid communication with each other and form a fluid conduit 36 through the interior of ball element 30. Third port 44 is in fluid communication with both first port 40 and second port 42. Third port 44 perpendicularly intersects fluid conduit 36, equidistant from first port 40 and second port 42.

The inside diameter of first port 40 and third port 44 should be equal to the inside diameter of upstream channel 22. Second port 42 does not have to be the same diameter as first port 40 and third port 44, but does in the preferred embodiment. Second port 44 should have the same inside diameter as downstream channel 24, so that the exterior surface of ball element 30 will not be in contact with fluid 14. It is important that the inside diameter of first port 40, third port 44, and upstream channel 22 be approximately equal, so that the exterior surface of ball element 50 does not contact fluid 12 when ball element is in the open or closed position. It is also important that the inside diameter of second port 42 and downstream channel 24 be approximately equal, so that the exterior surface of ball element 30 does not contact fluid 12 when ball element 30 is in the open or closed position.

Ball element 30 has an open position, as best seen in FIGS. 1, 3, and 5 and a closed position, as best seen in FIGS. 2, 4, and 6. When ball element 30 is in its open position, fluid 14 flows from upstream channel 22 through housing 20 and jacket 50, into first port 40 through fluid conduit 36 and subsequently out second port 42. After flowing through second port 42, fluid 14 continues through downstream channel 24 and throughout process piping 12. In the closed position, fluid 14 is prevented from flowing through ball element 30. In this position, fluid 14 is permitted to flow from upstream channel 22 within housing 20 and through jacket 50, and subsequently third port 44. However, once through third port 44, fluid 14 is contained within fluid conduit 36 and not permitted to continue to downstream channel 24.

The design of ball valve 10, including ball element 30, housing 20, and jacket 50, prevents scale from forming on the exterior surface of ball element 30. If scale is permitted to form on the exterior of ball element 30, the effectiveness of the seal formed between ball element 30 and jacket 50 is degraded, thus degrading the efficiency of ball valve 10. The present invention reduces the amount of time the exterior surface of ball element 30 is in contact with fluid 14, which occurs only when ball element 30 is being turned between its open and closed positions.

An additional element of the preferred embodiment of the present invention is a handle 56 to turn ball element 30 between its open and closed position. Those skilled in the art will recognize that there are other means for turning ball element 30 between its open and closed position. The numerous other means known to those skilled in the art for turning ball element 30, are within the scope of this disclosure.

In operation, ball valve 10 is placed within a length of process piping 12, having the same inside diameter as upstream channel 22, downstream channel 24, and fluid conduit 36. Ball valve 10 is connected to process piping 12 through a plurality of holes 60, positioned around a flange 62. There are many methods for connecting ball valve 10 to process piping 12 known to those skilled in the art, including nuts and bolts through plurality of holes 60 around flange 62, all of which are within the scope of this disclosure. When ball element 30 is in the open position, it functions as described above, and the force of fluid 14 passing through fluid conduit 36 does not permit scale formation within fluid conduit 36. In the closed position, fluid 14 does not contact the exterior surface of ball element 30, and thus does not permit scale formation on this surface. However, in the closed position, scale formation can occur within fluid conduit 36 and third port 44. When ball element 30 is turned back to the open position, the scale formation that may have accumulated within fluid conduit 36 is eroded away due to the forces of fluid 14.

The design of ball valve 10 prevents the formation of scale on the exterior surface of ball element 30, and thus extends the life and efficiency of ball valve 10. For the transportation and control of dangerous fluids, such as chlorine, the design of ball valve 10 prevents the capturing of quantities of fluid 14 within a closed system. Thus, explosions or pressure increases are prevented within ball valve 10. The preferred embodiment discloses a three port ball element 30 within a two-way housing 20. However, those skilled in the art will realize, after reading and understanding this disclosure, that the teachings provided herein can be adapted for use with other multi-port and milti-way housings.

It will be apparent to those skilled in the art that many substitutions and modifications can be made to the preferred embodiments described without departing from the spirit and scope of the present invention, which is defined by the appended claims.

What is claimed is:

1. A ball valve for controlling fluid flow, said ball valve having an open position that allows the fluid to flow through said ball valve and a closed position that prevents fluid from flowing through said ball valve, said ball valve comprising:

a housing having an inside surface, and an upstream channel and a downstream channel, said upstream channel having a size and shape;

a ball element dimensioned to fit inside said housing so that said ball element can rotate within said housing, said ball element having
an exterior surface,
a first port,
a second port forming a fluid conduit through said ball element with said first port, and
a third port intersecting said fluid conduit, said ball valve being in the open position when said first and said second ports of said bail element are aligned with said upstream and downstream channels and being in the closed position when said third port is aligned with said upstream channel and said first and second ports are not aligned with said upstream and downstream channels, said third port being dimensioned to be no smaller than the upstream channel so that, when said ball valve is in said closed position, said ball element provides no portion of its exterior surface on which scale from said fluid can build up to affect the rotation of said ball element, wherein said exterior surface of said ball element is impregnated with a fluoropolymer; and a fluoropolymer jacket carried by said inside surface of said housing to match said exterior surface of said ball element to facilitate rotation of said ball element within said housing.

2. A ball valve for controlling fluid flow, said ball valve having an open position that allows the fluid to flow through said ball valve and a closed position that prevents fluid from flowing through said ball valve, said ball valve comprising:

a housing having an inside surface, and an upstream channel and a downstream channel, said upstream channel having a size and shape;

a ball element dimensioned to fit inside said housing so that said ball element can rotate within said housing, said ball element having
an exterior surface,
a first port,
a second port forming a fluid conduit through said ball element, and
a third port intersecting said fluid conduit, said ball valve being in the open position when said first and said second ports of said ball element are aligned with said upstream and down stream channels, respectively, and being in the closed position when said third port is aligned with said upstream channel and said first and second ports are not aligned with said upstream and down stream channels, said third port being dimensioned to be no smaller than the upstream channel so that, when said ball valve is in said closed position, said ball element provides no portion of its exterior surface on which scale from said fluid can build up to affect the rotation of said ball element; and a fluoropolymer impregnated on said exterior surface of said ball element to facilitate rotation of said ball element.

3. The ball valve as recited in claim 2, further comprising a jacket carried by said inside surface of said housing and matching said impregnated exterior surface of said ball element, said jacket being made of a material that facilitates rotation of said ball element.

* * * * *

UNITED STATES PATENT AND TRADEMARK OFFICE
CERTIFICATE OF CORRECTION

PATENT NO. : 5,588,638
DATED : 12-31-96
INVENTOR(S) : Bunting et al.

It is certified that error appears in the above-indentified patent and that said Letters Patent is hereby corrected as shown below:

In the Abstract, line 13, cancel the sentence:
"The design of the ball element does allow the exterior surface of the ball element to be exposed to the fluid, and thus prevents scale formation from occurring on this surface."

and insert the following sentence:

"The design of the ball element does not allow the exterior surface of the ball element to be exposed to the fluid, and thus prevents scale formation from occurring on this surface."

Signed and Sealed this

Twenty-fifth Day of March, 1997

Attest:

BRUCE LEHMAN

*Attesting Officer*          *Commissioner of Patents and Trademarks*